United States Patent
Ha et al.

(10) Patent No.: US 12,260,496 B2
(45) Date of Patent: Mar. 25, 2025

(54) METHOD AND DEVICE FOR LIGHT ESTIMATION

(71) Applicant: SAMSUNG ELECTRONICS CO., LTD., Suwon-si (KR)

(72) Inventors: Inwoo Ha, Seongnam-si (KR); Jinwoo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 17/971,049

(22) Filed: Oct. 21, 2022

(65) Prior Publication Data

US 2023/0343025 A1    Oct. 26, 2023

(30) Foreign Application Priority Data

Apr. 20, 2022  (KR) .......................... 10-2022-0049051

(51) Int. Cl.
| | |
|---|---|
| G06T 15/60 | (2006.01) |
| G06T 5/92 | (2024.01) |
| G06T 7/579 | (2017.01) |
| G06T 19/00 | (2011.01) |
| G06V 10/60 | (2022.01) |
| G06V 10/74 | (2022.01) |

(52) U.S. Cl.
CPC ................ *G06T 15/60* (2013.01); *G06T 5/92* (2024.01); *G06T 7/579* (2017.01); *G06T 19/006* (2013.01); *G06V 10/60* (2022.01); *G06V 10/761* (2022.01); *G06T 2207/20081* (2013.01)

(58) Field of Classification Search
None
See application file for complete search history.

(56) References Cited

U.S. PATENT DOCUMENTS

| | | | |
|---|---|---|---|
| 6,628,298 B1 | 9/2003 | Debevee | |
| 7,171,037 B2 | 1/2007 | Mahon et al. | |
| 9,805,510 B2 * | 10/2017 | Siddiqui | ................... G06T 7/73 |
| 10,089,960 B2 | 10/2018 | Greenebaum et al. | |
| 10,412,373 B2 | 9/2019 | Pitts | |
| 11,465,162 B2 * | 10/2022 | Sibley | .................. A01C 21/005 |
| 12,086,927 B2 * | 9/2024 | Urnau Gotardo | ..... G06T 15/205 |

(Continued)

FOREIGN PATENT DOCUMENTS

| | | |
|---|---|---|
| KR | 10-2011-0059275 A | 6/2011 |
| KR | 10-2013-0060158 A | 6/2013 |

(Continued)

*Primary Examiner* — Nurun Flora
(74) *Attorney, Agent, or Firm* — NSIP Law

(57) ABSTRACT

A method and device with light estimation are provided. A method performed by an electronic device includes generating a reference image based on image data acquired by capturing a reference object and based on a first image signal processing (ISP) setting, generating a background image based on raw image data acquired by capturing a real background in which the reference object is positioned and based on a second ISP setting, estimating light information corresponding to the background image using a light estimation model, rendering a virtual object image corresponding to the light information and the reference object, and training the light estimation model based on a difference between the reference image and the virtual object image.

23 Claims, 10 Drawing Sheets

(56) References Cited

U.S. PATENT DOCUMENTS

| | | | |
|---|---|---|---|
| 2004/0150641 A1* | 8/2004 | Duiker | G06T 15/20 |
| | | | 345/426 |
| 2021/0279952 A1 | 9/2021 | Chen et al. | |
| 2021/0358099 A1* | 11/2021 | Matsubara | G01J 3/10 |
| 2021/0406581 A1 | 12/2021 | LeGendre et al. | |
| 2023/0031464 A1* | 2/2023 | Kasugai | G06T 15/506 |

FOREIGN PATENT DOCUMENTS

| | | |
|---|---|---|
| KR | 10-2019-0112894 A | 10/2019 |
| WO | WO 2021/042208 A1 | 3/2021 |

\* cited by examiner

Virtual object image 710

METHOD AND DEVICE FOR LIGHT ESTIMATION

CROSS-REFERENCE TO RELATED APPLICATIONS

This application claims the benefit under 35 USC § 119(a) of Korean Patent Application No. 10-2022-0049051, filed on Apr. 20, 2022, at the Korean Intellectual Property Office, the entire disclosure of which is incorporated herein by reference for all purposes.

BACKGROUND

1. Field

The following description relates to a method and device with light estimation.

2. Description of Related Art

Light estimation is a technique for estimating light illuminating a scene. Estimated light information may be used to render a virtual object in a corresponding image or space. For example, the estimated light information may be applied to a virtual object in an augmented reality (AR) or computer graphics (CG) environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method performed by an electronic device includes generating a reference image based on image data acquired by capturing a reference object and based on a first image signal processing (ISP) setting, generating a background image based on raw image data acquired by capturing a real background in which the reference object is positioned and based on a second ISP setting, estimating light information corresponding to the background image using a light estimation model, rendering a virtual object image corresponding to the light information and the reference object, and training the light estimation model based on a difference between the reference image and the virtual object image.

The first ISP setting may be configured to control an ISP element according to a fixed value, and the second ISP setting may be configured to control the ISP element according to a variable value.

The ISP element may include one or more of auto white balance element, an auto exposure element, a gamma correction element, a dynamic range compression element, or a wide dynamic range element.

The reference object may include sub-objects, each of which may have a tone or material different from each of the other sub-objects.

The sub-objects may include respective planes that support the sub-objects.

The sub-objects may be respectively represented by image data portions having different dynamic ranges in the raw image data, and a portion of image data having a widest dynamic range among the image data portions may be selected for determining the difference between the reference image and the virtual object.

The reference object may be structurally connected, through a support, to a camera that may generate the reference image and the background image.

The camera may include a first camera that may generate the reference image according to the first ISP setting, and a second camera that may generate the background image according to the second ISP setting.

The rendering of the virtual object may include rendering a shadow of the virtual object image, and the training of the light estimation model may include training the light estimation model based on a difference between image data of a shadow of the reference object in the reference image and the rendered shadow of the virtual object image.

The reference image may be generated by a camera using the first ISP setting, and wherein the background image may be generated by the camera using the second ISP setting.

Input data corresponding to the background image and the second ISP setting may be used as an input for the light estimation model.

The reference image may include a first reference image captured at a first position in a first direction and a second reference image captured at a second position in a second direction, the background image may include a first background image captured at the first position and in the first direction, and a second background image captured at the second position and in the second direction, the estimating of the light information may include estimating integrated light information corresponding to an integrated background image in which the first background image and the second background image may be combined according to simultaneous localization and mapping (SLAM) information based on the first position, the second position, the first direction, and the second direction, the rendering of the virtual object may include rendering, based on the integrated light information, a first virtual object image corresponding to the first position and the first direction and a second virtual object image corresponding to the second position and the second direction, and the training of the light estimation model may include training the light estimation model based on a difference between the first reference image and the first virtual object image and a difference between the second reference image and the second virtual object image.

In one general aspect, a method of estimating light includes generating a background image based on raw image data acquired by capturing a real background relative to which a virtual object is to be displayed and based on a second image signal processing (ISP) setting, estimating light information corresponding to the background image and a first ISP setting using a light estimation model, rendering a virtual object image of the virtual object based on the light information, and generating an augmented reality (AR) image according to the virtual object image and the background image.

The generating the AR image may include synthesizing the virtual object image and the background image, wherein the AR image may include image data based on both the virtual object image and image data based on the background image.

A simulated ISP element may generate the virtual object image based on the second ISP setting, and the virtual object image may be used to generate the AR image without controlling the ISP element based on the second ISP setting, in response to the AR image being displayed on a translucent display.

The simulated ISP element may be used based on an opaque display being used to display the AR image.

The light estimation model may be pre-trained through generating a sample reference image generated based on raw image data acquired by capturing a reference object and based on a first ISP setting, generating a sample background image generated based on raw image data acquired by capturing a sample real background in which the reference object may be positioned and based on the second ISP setting, estimating sample light information corresponding to the sample background image using the light estimation model, rendering a sample virtual object image corresponding to the sample light information and the reference object, and training the light estimation model based on a difference between the sample reference image and the sample virtual object image.

In one general aspect, an electronic device, includes a camera configured to generate a reference image based on raw image data acquired by capturing a reference object and based on a first image signal processing (ISP) setting, and generate a background image based on raw image data acquired by capturing a real background in which the reference object is positioned and based on a second ISP setting, and a processor is configured to estimate light information corresponding to the background image using a light estimation model, render a virtual object image corresponding to the light information and the reference object, and train the light estimation model based on a difference between the reference image and the virtual object image.

The first ISP setting may be configured to control an ISP element according to a fixed value, and the second ISP setting may be configured to control the ISP element according to a variable value.

The reference object may include sub-objects, each of which may have a tone or may include a material different from each of the others, and the sub-objects may include respective planes, the sub-objects may be respectively represented by image data portions having different dynamic ranges in the raw image data, and a portion of image data having a widest dynamic range among the objects may be selected, based thereon, to be used in determining the difference between the reference image and the virtual object.

Input data corresponding to the background image and the second ISP setting may be used as an input for the light estimation model.

The reference image may include a first reference image captured at a first position in a first direction and a second reference image captured at a second position in a second direction, the background image may include a first background image captured at the first position and in the first direction, and a second background image captured at the second position and in the second direction, the processor may be configured to estimate integrated light information corresponding to an integrated background image in which the first background image and the second background image may be combined according to simultaneous localization and mapping (SLAM) information based on the first position, the second position, the first direction, and the second direction, render, based on the integrated light information, a first virtual object image corresponding to the first position and the first direction and a second virtual object image corresponding to the second position and the second direction, and train the light estimation model based on a difference between the first reference image and the first virtual object image and a difference between the second reference image and the second virtual object image.

A method performed by a computing device, the method may include generating a first camera image, the first camera image having been captured by a camera and generated with an image processing algorithm according to a first value of a variable setting of the image processing algorithm, generating a second camera image, the second camera image having been captured by the camera and generated with the image processing algorithm according to a second value of the variable setting of the image processing algorithm, generating first light information by a trained light estimation model based on the first value, generating second light information by the trained light estimation model based on the second value, rendering a first image of a virtual object based on the first light information and a second image of the virtual object based on the second light information, and displaying the first and second images of the virtual object.

The trained light estimation model may include a neural network.

The neural network may have been trained to minimize a loss corresponding to an image difference, the image difference may further include a difference between a first sample image generated according to the image processing algorithm at a first sample value and a second sample image generated according to the image processing algorithm at a second sample value.

The second sample value may correspond to either the image processing algorithm being inactive or without effect, or the image processing algorithm having a default or fixed effect.

The first light information and the second light information comprise information about direction and/or brightness of light.

A non-transitory computer-readable storage medium may store instructions that, when executed by a processor, cause the processor to perform any of the methods.

Other features and aspects will be apparent from the following detailed description, the drawings, and the claims.

Figure 1:
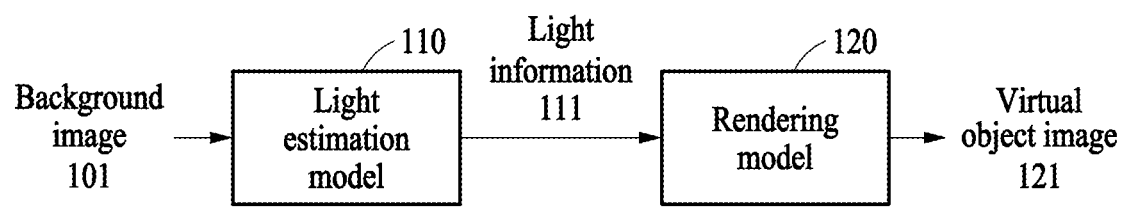
FIG. 1 illustrates an example of a configuration of an image processing model, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a" "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Light estimation or modeling is a technique for estimating the illumination of a scene. Examples described herein may include using estimated light information to render a virtual object in a corresponding image or space. For example, the estimated light information may be applied to a virtual object in an augmented reality (AR) or computer graphics (CG) environment. The more accurately the light information is estimated, the more realistically the virtual object may be rendered. A machine learning-based model may be used for light estimation. The model may be trained using dues such as ambient light, shadings, specular highlights, and reflections.

FIG. 1 illustrates an example of a configuration of an image processing model, according to one or more embodiments. Referring to FIG. 1, a light estimation model 110 may estimate light information 111 corresponding to a background image, and a rendering model 120 may render a virtual object image 121 based on the light information 111.

The background image 101 may be an image of a scene of a captured view that is viewed from a capturing point (the view and capture point may, in some implementations, be predetermined). Light information 102 may include information about all light affecting the scene of the background image 101. The light information 102 may represent the light of the scene in various forms. For example, the light information 102 may represent light in a form of an environment map, or may represent light using predefined attributes (e.g., direction, color, brightness, width, etc.).

The background image 101 may include image data of a real background behind which a virtual object is displayed in a superimposed manner, for example on a semi-transparent surface between the real background and a user viewing the virtual object, or on an opaque display which the user may in front of the real background. The light information 102 may be applied to a virtual object rendered in an augmented reality (AR) or computer graphics (CG) environment. For example, when an example AR system is overlaying a virtual object on the background image 101, the light information 102 may be applied to the rendering of the virtual object such that the virtual object may be displayed on the background image 101 with improved harmony between the two. The more accurately the light information 102 represents the light in the background image 101, the more realistic or scene-accurate the virtual object may be.

The light estimation model 110 may be a machine learning model. For example, the light estimation model 110 may include a deep neural network (DNN) based on deep learning. The DNN may include a plurality of layers, and at least a portion thereof may be configured as various networks such as a fully connected network (FCN), a convolutional neural network (CNN), and a recurrent neural network (RNN). The DNN may have a general ability to, based on deep learning, map input data and output data that may have a nonlinear relationship. At least a portion of the plurality of layers of the light estimation model 110 may correspond to one or more CNNs, and at least another portion thereof may correspond to one or more FCNs.

In general, during a process of generating an image using a camera, image signal processing (ISP) may be performed, typically through an image processing pipeline. For example, raw image data corresponding to visual information may be generated through an image sensor, and the ISP may be applied to the raw image data to generate the image. In this example, an ISP element may be controlled according to a variable adjust value. For example, the ISP element may include, for example, one or more of an auto white balance element/stage, an auto exposure element/stage, a gamma correction element/stage, a dynamic range compression element/stage, and/or a wide dynamic range element/stage, and these ISP elements may be freely adjusted (or activated/deactivated) depending on a variable adjust value. An ISP setting allowing free control (varying) of an ISP element depending on the variable adjust value may be referred to as a variable ISP setting.

In response to the background image 101 being generated through the variable ISP setting, an accuracy gap between the light information 111 and actual light of a real background corresponding to the background image 101 may occur. For example, in response to the real background having low illuminance, due to an auto exposure control, the background image 101 thereof may have high brightness (as caused by the auto exposure control), and the light estimation model 110 may correspondingly generate the light information 111 to have high illuminance, whereas the actual light condition of the real background is low illuminance. As another example, in response to the real background being illuminated by a yellow light, auto white balance may adjust a color of the background image 101 such that the background image 101 has more white light (is whiter), and the light information 111 may be correspondingly generated to the white light. In the above examples, the high brightness and the white light of the respective light information do not accurately represent the actual light information. In the case of an AR function being provided through an AR device using a translucent display such as AR glasses, it may be desirable for a virtual object presented on a translucent display to be rendered correspondingly to the actual light of the real background. For example, when a virtual object corresponding to high illuminance light information (e.g., is bright) is presented on a translucent display in a low-illuminance real environment, or when a virtual object corresponding to low illuminance light information (e.g., is dim) is presented on a translucent display in a high-illuminance real environment, the virtual object may be presented unnaturally relative to a real background that a user sees through the translucent display.

The light estimation model 110 may be trained based on actual light information. The actual light information may be estimated through fixed ISP setting. Here, "setting" may be one or more settings of one or more ISP elements. Unlike a variable ISP setting, the fixed ISP setting may use a limited fixed adjust value. For example, the fixed ISP setting may control an ISP element with a predetermined adjust value, or may not adjust an adjustable ISP element (e.g., allowing it to operate in a default state). The latter case may correspond to a state in which an ISP function is turned off, or a state in which an adjust value is "0" (e.g., the ISP element has no, or negligible, effect on the raw image). The light estimation model 110 may estimate the light information 111 as corresponding to absolute light of the actual light (having been trained using the fixed ISP setting.

Figure 2:
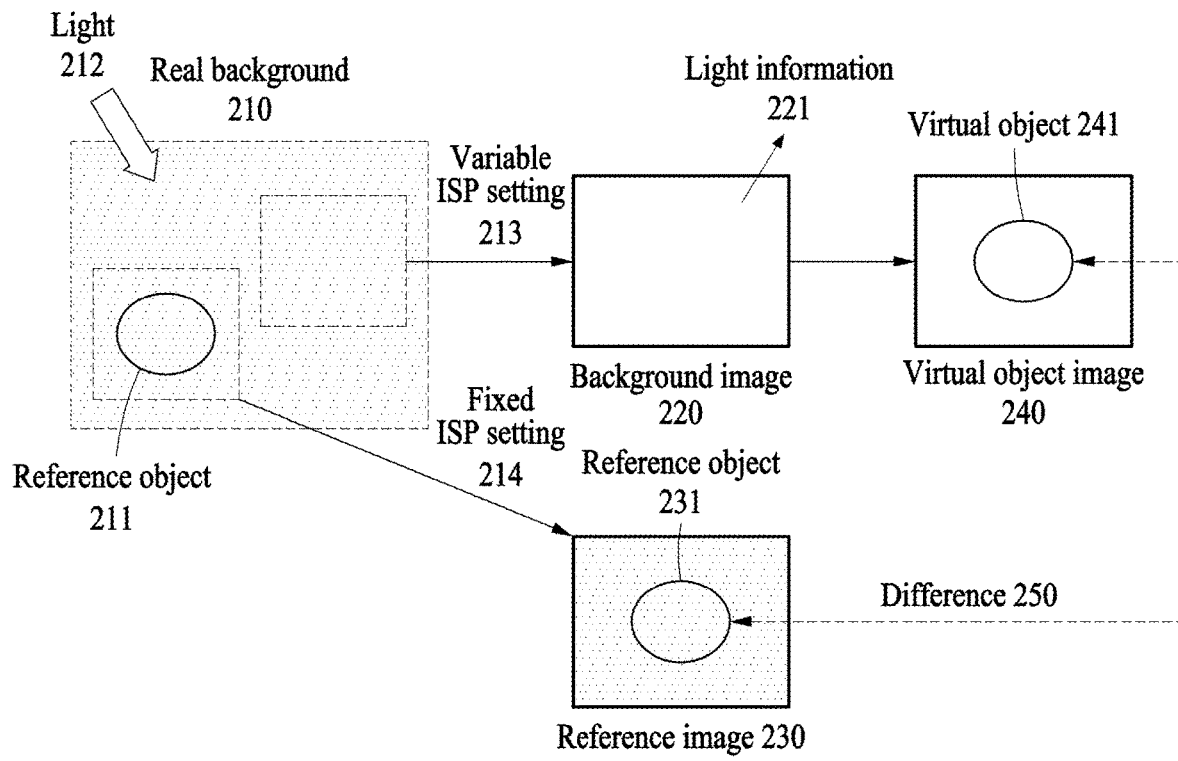
FIG. 2 illustrates an example of components used to train a light estimation model, according to one or more embodiments.

FIG. 2 illustrates an example of components used to train a light estimation model, according to one or more embodiments. Referring to FIG. 2, actual light 212 may be may be incident upon a reference object 211 positioned on a real background 210, and a light estimation model may be trained to estimate the light 212.

The light estimation model may be trained based on a background image 220 and a reference image 230. The background image 220 may be generated based on raw image data acquired by capturing the real background 210 with a camera according to a variable ISP setting 213. Because the variable ISP setting 213 is applied, the background image 220 may reflect information that somewhat differs from the actual light 212 when the background image 220 is captured. The reference image 230 may be generated based on the fixed ISP setting 214 and raw image data acquired by capturing the reference object 211. The reference image 230 may include a reference object portion 231 corresponding to the reference object 211. According to the fixed ISP setting 214, the reference image 230 may reflect information close to the actual light 212 when the reference image 230 is captured. For example, when the actual light 212 provides low illuminance, the background image 220 may correspond to high illuminance (e.g., may be brighter) due to an exposure being controlled according to the variable ISP setting 213, in contrast to the reference image 230, which may correspond to low illuminance (e.g., may be dimmer) due to the fixed ISP setting 214.

The light estimation model may estimate the light information 221 based on the background image 220. A rendering model may generate a virtual object image 240 by rendering a virtual object 241 corresponding to the reference object 211 based on the light information 221 from the background image 220. The rendering model may perform rendering based on object information and plane information in addition to the light information 221. For example, the rendering model may perform neural rendering. The object information and the plane information may be information known in advance about the reference object 211. The object information may include one or more of a pose, a shape, or a material (e.g., type of material) of an object (e.g., corresponding to the reference object 2110, or any combination thereof. The material information may represent a texture, a color, or the like. The plane information may be information about a reference plane object/structure that supports the reference object, and may include at least one of a pose (e.g., a normal direction), a shape, and a material of the reference plane, or any combination thereof. The virtual object image 240 may include the virtual object 241 corresponding to the reference object 211. The rendering model may render the virtual object 241 based on the light information 221, the object information, and the plane information.

A difference 250 between the reference object portion 231 in the reference image 230 and the virtual object 241 in the virtual object image 240 may correspond to an error between the actual light 212 and the light information 221. The light estimation model may be trained according to the difference 250. The light estimation model may be trained to reduce a loss of a loss function corresponding to the difference 250. Accordingly, the light estimation model may have an ability to learn to estimate the actual light 212 from the background image 220 according to the variable ISP setting 213.

The rendering model may render shading of the virtual object 241 and/or a shadow of the virtual object 241, and the difference 250 may include the difference 250 between pixel data representing shading and/or a shadow of the reference object portion 231 and pixel data representing the shading and/or the shadow of the virtual object 241. The rendering model may perform shading rendering and/or shadow rendering at the same time or at different times, and generate a rendering by fusing the result of the shading rendering with the result of the shadow rendering.

Light estimation model input data ("input data" hereafter) corresponding to the background image 220 may be used as input data for the light estimation model. For example, when the variable ISP setting 213 may not be readily determined, such as when a parameter value for the variable ISP setting 213 is not provided, the input data of the light estimation model may be configured without the variable ISP setting 213. Alternatively, input data corresponding to the background image 220 and the variable ISP setting 213 may be used as input for the light estimation model. For example, when the variable ISP setting 213 may be determined, such as when the parameter value for the variable ISP setting 213 is provided, the input data may be configured according to the variable ISP setting 213.

Figure 3:
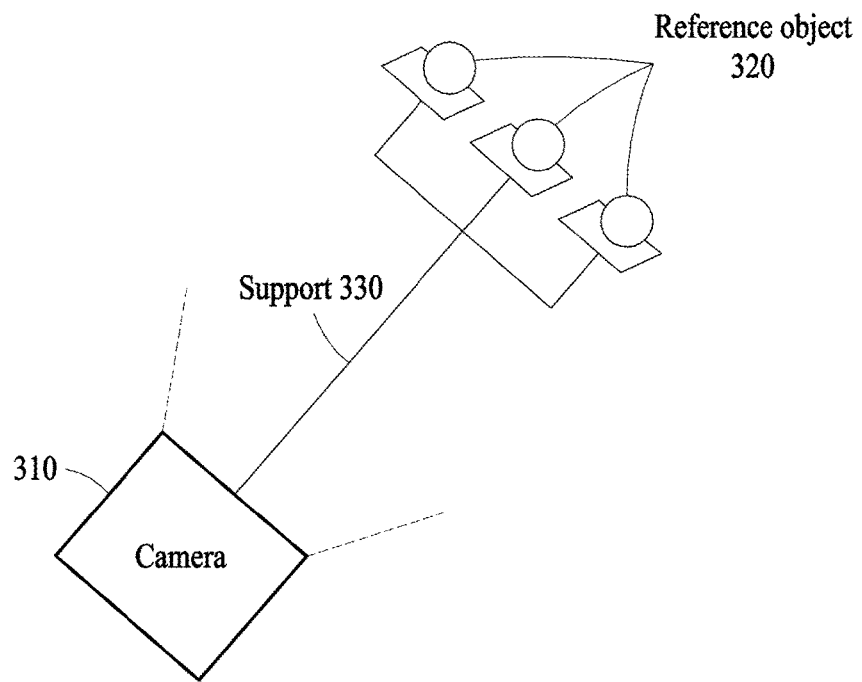
FIG. 3 illustrates an example of an image capturing environment, according to one or more embodiments.

FIG. 3 illustrates an example of an image capturing environment, according to one or more embodiments. Referring to FIG. 3, a camera 310 may generate a reference image by capturing a reference object 320, and generate a background image by capturing a real background in which the reference object is positioned. To obtain light information, instead of collecting direct light, which tends to have a significantly high brightness value, collecting indirect light from the reference object 320 may be advantageous. The reference object 320 may include multiple sub-objects, each of which may have a tone or a material different from the others, and planes supporting the objects (which may or may not differ from each other). For example, the sub-objects may have a variety of tones, such as a white tone, and a gray tone. In addition, the sub-objects may be formed of a variety of materials, such as an even-textured material, a shiny (or specular) metallic material, and a bumpy material. The sub-objects may have a variety of shapes, for example, a sphere shape, a star shape, and a cup shape. A reference object or sub-object may be implemented as a combination of a sphere and a supporting plane. The combination of the sphere and the supporting plane may effectively provide clues that may be used to estimate actual light. For example, the sphere may provide a clue as to a shading, and the supporting plane may provide a clue as to a shadow. However, the reference object is not limited to being the combination of the sphere and the supporting plane.

If multiple sub-objects are used, having a respective variety of tones thereof may help to reduce the possibility of saturation in a high dynamic range (HDR) environment and may allow light information to be collected from the widest possible range of light. In particular, with the fixed ISP setting being used, it is highly likely that brightness saturation will occur because an image may be captured without adjusting exposure or sensitivity of a sensor. When sub-objects with various tones, for example, are captured and capturing information indicating which sub-object has a most suitable tone for a capturing environment that is used, appropriate light information may be collected (e.g., from the tone-appropriate object) regardless of the capturing environment. The sub-objects may be represented by respective portions of image data in different dynamic ranges in raw image data acquired by capturing the reference object 320, and a portion of image data having a widest dynamic range (among the portions of image data of the respective sub-object) may be selectively used for determining a difference between the reference image and the virtual object image. For example, capturing information of a gray sphere may be used because a white sphere in a high illuminance environment may cause saturation. Alternatively, capturing information of the white sphere may be used in a low illuminance environment. In some embodiments, the portion of image data corresponding to the most suitable sub-object for a given light/capturing environment may be determined automatically using techniques such as detecting the sub-objects, segmenting the reference image to isolate the portions of image data of the respective sub-objects, and analyzing the content to determine measures of image quality of the portions, e.g., measures of hue, saturation, contrast, range, evenness of distribution, and so forth.

The camera 310 may be a plurality of cameras or a single camera. In one example, the camera 310 may include a first camera that generates a reference image using the fixed ISP setting, and a second camera that generates a background image using the variable ISP setting (if both are captured at the same time they may both represent the same capturing environment). In another embodiment, the same camera may generate the reference image using the fixed ISP setting right before or after capturing the background image using the variable ISP setting. The reference object 320 may be connected to the camera 310 through a support 330, which may facilitate accuracy and consistency.

Figure 4:
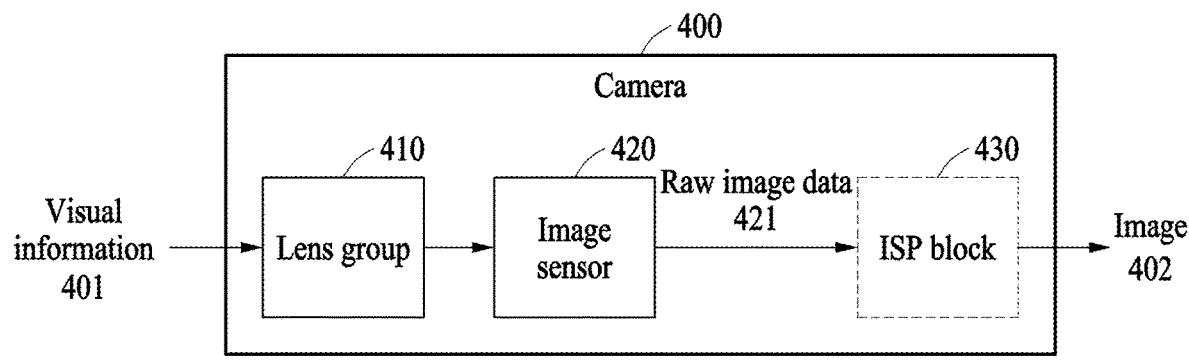
FIG. 4 illustrates an example of a configuration of a camera, according to one or more embodiments.

FIG. 4 illustrates an example of a configuration of a camera, according to one or more embodiments. Referring to FIG. 4, a camera 400 may generate an image 402 corresponding to visual information 401. The camera 400 may include a lens group 410, an image sensor 420, and an ISP block 430. The ISP block 430 may generate the image 402 by performing ISP based on raw image data 421 from the image sensor 420. The ISP block 430 may include a software module and/or a hardware module for performing the ISP.

The camera 400 may correspond to a sub-camera of a plurality of cameras or a single camera. In an example of using two cameras, a first camera may generate the reference image using the fixed ISP setting and a second camera may generate the background image using the variable ISP setting. That is, when the camera 400 is the first camera and a limited ISP setting is used, the ISP block 430 may use the fixed ISP setting. When an ISP function is excluded, the ISP block 430 may be omitted (e.g., not present, deactivated, etc.). When the camera 400 is the second camera, the ISP block 430 may generate the image 402 using the variable ISP setting.

Figure 5:
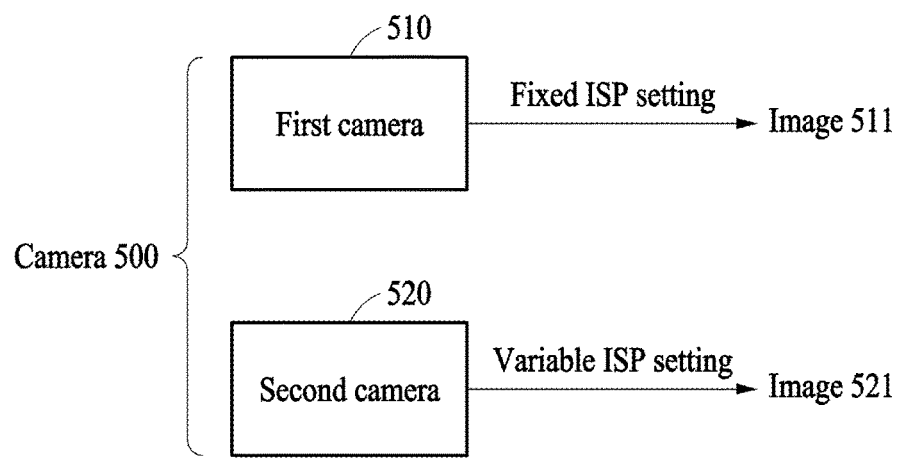
FIG. 5 illustrates an example of a configuration of a plurality of cameras, according to one or more embodiments.
Figure 6:
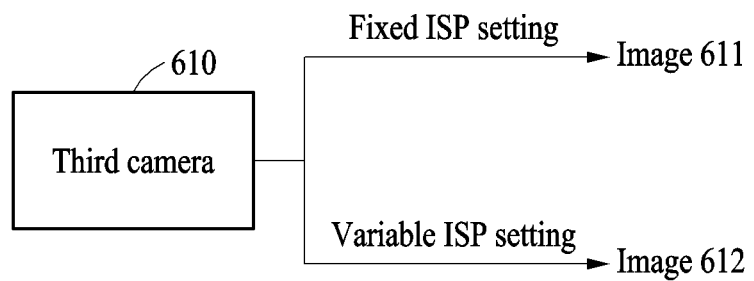
FIG. 6 illustrates an example of a configuration of a single camera, according to one or more embodiments.

FIG. 5 illustrates an example of a configuration of a plurality of cameras, according to one or more embodiments. Referring to FIG. 5, a camera 500 may include a first camera 510 that generates an image 511 using a fixed (e.g., default or unchangeable) ISP setting, and a second camera 520 that generates an image 521 using a variable ISP setting (usually, sufficiently different than the fixed ISP setting to provide an effective image difference). FIG. 6 illustrates an example of a configuration of a single camera, according to one or more embodiments. Referring to FIG. 6, a third camera 610 may generate an image 611 and an image 612 alternately using a fixed ISP setting and a variable ISP setting.

Figure 7:
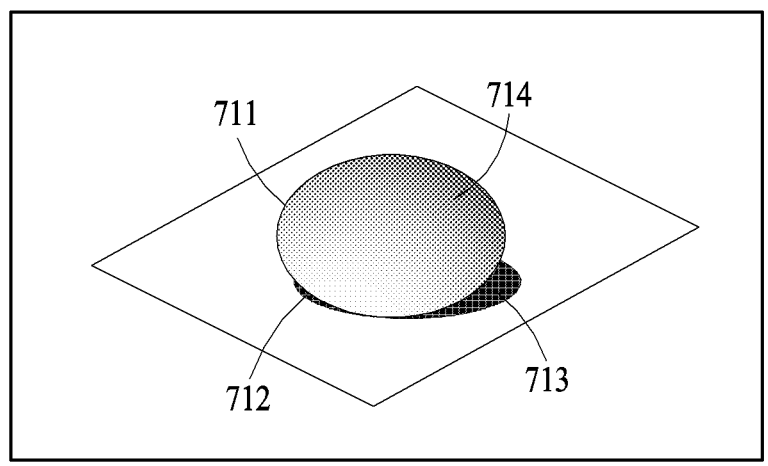
FIG. 7 illustrates an example of a configuration of a virtual object image, according to one or more embodiments.

FIG. 7 illustrates an example of a configuration of a virtual object image, according to one or more embodiments. Referring to FIG. 7, a virtual object image 710 may include a virtual object 711, shading 714 of the virtual object 711, and/or shadows 712 and 713 of the virtual object 711. Each of these elements of the virtual object image 710 may be rendered based on light information, object information, and plane information. The shading 714 may be derived through a shading rendering scheme (e.g., one or more shaders in a three-dimensional graphics sub-system of an AR system), and the shadows 712 and 713 may be derived through a shadow rendering scheme. The virtual object image 710 may be formed through fusing or merging the shading 714 and the shadows 712 and 713. The virtual object image 710 may be compared with the reference object in the reference image, and a light estimation model may be updated according to a comparison result (e.g., a difference). Here, pixel data of a region (e.g., a reference object region) in the reference image and pixel data of a corresponding region in the virtual object image 710 may be compared. For example, pixel data representing shading and a shadow of the reference object and pixel data representing the shading 714 and the shadows 712 and 713 of the virtual object 711 may be compared pixel by pixel. In some embodiments, one or both images may be transformed (e.g., resized, clipped, or the like) to align their respective objects.

Figure 8A:
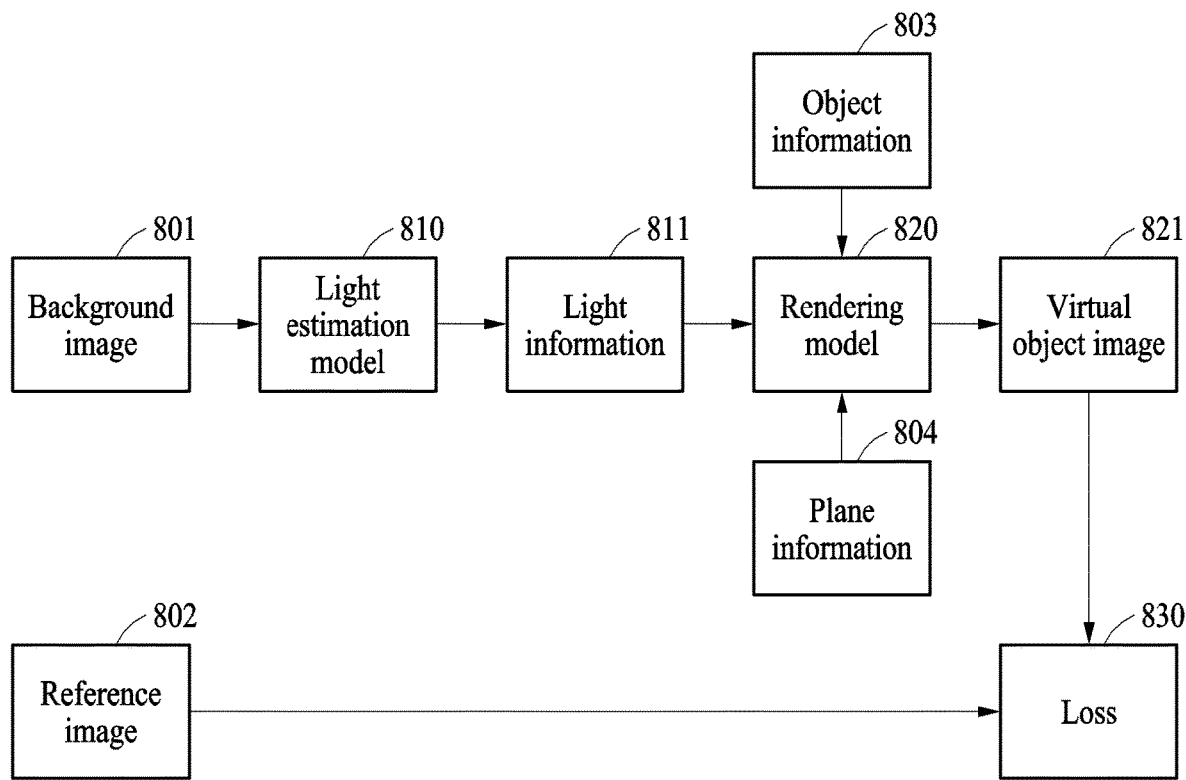
FIGS. 8A-8B illustrates an example of training a light estimation model, according to one or more embodiments.
Figure 8B:
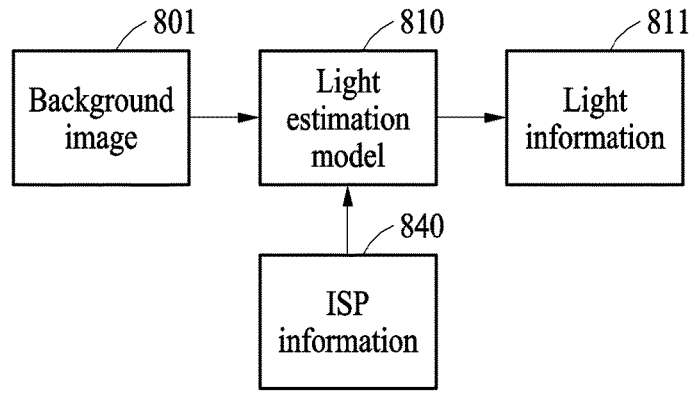

FIGS. 8A-8B illustrate an example of training a light estimation model, according to one or more embodiments. Referring to FIG. 8A, a background image 801 and a reference image 802 may be obtained. The background image 801 may be generated based on raw image data acquired by capturing a real background behind which the reference object is positioned and based on a variable ISP setting. The reference image 802 may be generated based on raw image data acquired by capturing the reference object and based on a fixed ISP setting. The variable ISP setting may control an ISP element with a variable adjust value, and the fixed ISP setting may control the ISP element with a fixed adjust value. A light estimation model 810 may estimate light information 811 corresponding to the background image 801. The light estimation model 810 may be, for example, a neural network model including an encoder and a decoder. A rendering model 820 may render a virtual object image 821 based on the light information 811, object information 803, and plane information 804. The light estimation model 810 may be trained based on a loss 830 corresponding to a difference between the reference image 802 and the virtual object image 821.

Referring to FIG. 8B, ISP information 840 may be additionally provided to the light estimation model 810. For example, when a variable ISP setting value may not be readily determined, such as when a camera does not provide a parameter value for the variable ISP setting, input data of the light estimation model may be configured without the variable ISP setting value as illustrated in FIG. 8A. Alternatively, when the variable ISP setting value may be determined, such as when the camera provides the parameter value for the variable ISP setting, the input data may be configured to include the variable ISP setting value. Here, the ISP information 840 may include the variable ISP setting value. The light estimation model 810 may generate the light information 811 based on input data that includes the ISP information 840. The ISP information 840, when available, may improve estimation accuracy of the light estimation model 810.

Figure 9:
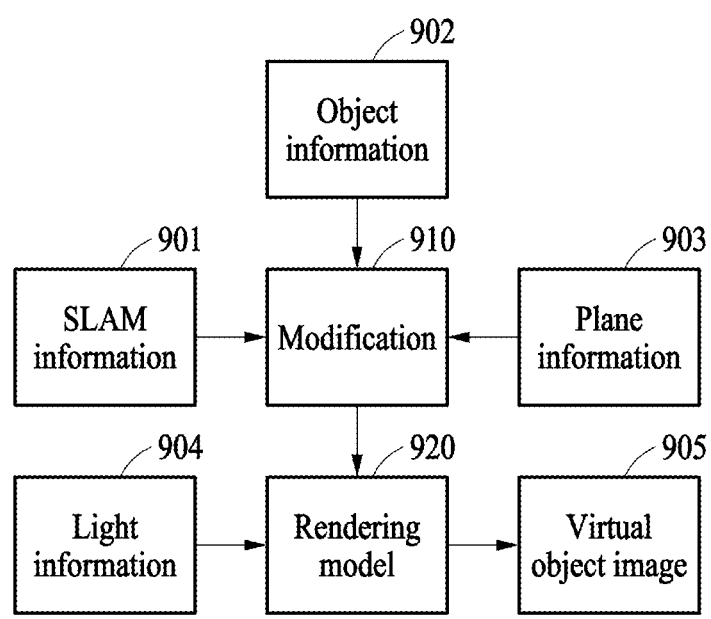
FIG. 9 illustrates an example of rendering a virtual object image, according to one or more embodiments.

FIG. 9 illustrates an example of rendering a virtual object image, according to one or more embodiments. Referring to FIG. 9, a rendering model 920 may perform rendering based on further information such as simultaneous localization and mapping (SLAM) information 901. A plurality of background images and a plurality of reference images (respectively paired) may be generated according to a change in a position and/or direction of a camera and a reference object, and the change in the position and/or direction may be recorded in the SLAM information 901. For example, a first reference image and a first background image may be generated at a camera first position in a first direction, and a second reference image and a second background image may be generated at a camera second position in a second direction.

The SLAM information 901 may include stored positions-directions of the respective background-reference image pairs, and integrated light information corresponding to the light information 904 according to the respective positions and the directions may be estimated based on the SLAM information 901. For example, the integrated light information corresponding to the light information 904 may be estimated through modification 910 using the SLAM information 901, the object information 902, and the plane information 903.

The rendering model 920 may render a virtual object image 905 for each position-direction based on the integrated light information. For example, the rendering model may render a first virtual object image corresponding to the first position and the first direction and a second virtual object image corresponding to the second position and the second direction. The light estimation model may be trained based on a difference between the first reference image and the first virtual object image and a difference between the second reference image and the second virtual object image. More than two virtual-real image pairs of images may be used.

Figure 10:
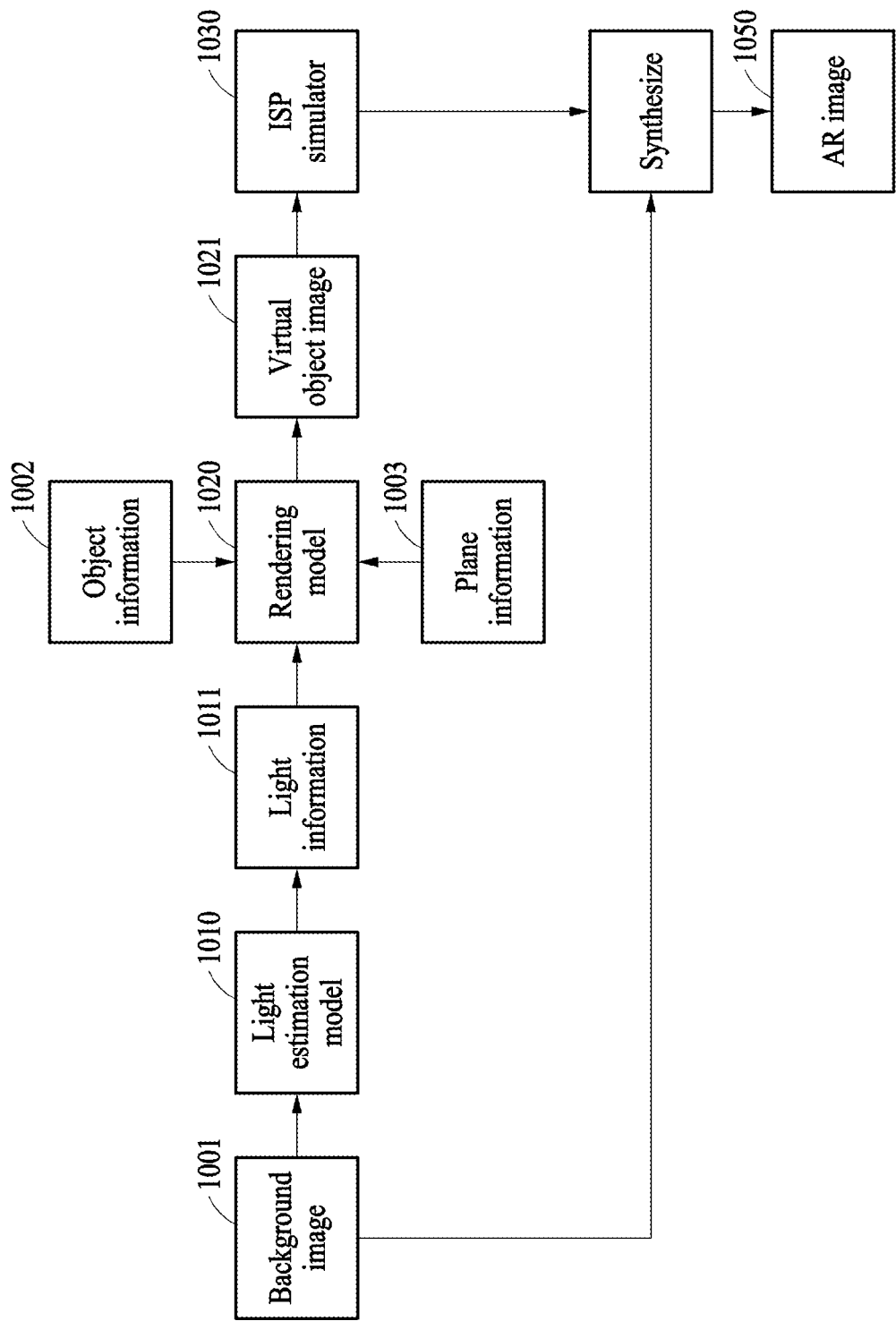
FIG. 10 illustrates an example of generating an augmented reality (AR) image using a light estimation model, according to one or more embodiments.

FIG. 10 illustrates an example of generating an AR image using a light estimation model, according to one or more embodiments. The generation of FIG. 10 may be for actual use after training has been performed. Referring to FIG. 10, a light estimation model 1010 may estimate light information 1011 corresponding to a background image 1001. The background image 1001 may be generated based on a variable ISP setting. For example, the background image 1001 may be generated through a camera having a specification that is the same as a specification of a camera used to obtain a sample background image during training (the cameras need not be the same physical cameras; training can be performed in advance with another camera/device). The light estimation model 1010 may be in a state in which training is completed, and may therefore estimate the light information 1011 to be close to actual light. A rendering model 1020 may render a virtual object image 1021 based on the light information 1011, object information 1002, and plane information 1003. The virtual object image 1021 may be represented such that it is in harmony with actual light captured by the background image 1001. For example, the virtual object image 1021 may be represented in a high illuminance state (e.g., high overall brightness/intensity) in response to actual light corresponding to a high illuminance environment, and the virtual object image 1021 may be represented in a low illuminance state (e.g., low brightness/intensity) in response to the actual light corresponding to a low illuminance environment.

An ISP simulator 1030 may adjust at least a part of an ISP element of the virtual object image 1021, as necessary, to enhance the consistency of the final AR image 1050 containing the virtual object image 1021 with the display environment. The ISP simulator 1030 may operate in different ways according to a characteristic or type of a display device on which an AR image 1050 is displayed. For example, in response to the AR image 1050 being displayed on an opaque type of display (e.g., a display of a smartphone, a table personal computer (PC), a vehicle display, etc.), the ISP simulator 1030 may control a variable ISP setting of a simulated ISP element that is used to modify/generate the virtual object image 1021. The simulated ISP element may be any of the types of camera ISP elements described above. The variable ISP setting may be used to adjust an ISP setting used to modify/generate the background image 1001, and the ISP setting may be provided via a camera that generates the background image 1001 (or, from a setting outside the camera that is used to set the camera's ISP setting). Conversely, in response to the AR image 1050 being displayed on a translucent display (e.g., a display of AR glasses, etc.), the virtual object image 1021 may be used to generate the AR image 1050 without controlling the simulated ISP element based on the variable ISP setting (or with a setting thereof that corresponds to a translucent display).

The AR image 1050 may be generated by combining an adjustment result of the ISP simulator 1030 and the background image 1001. In case no adjustment by the ISP simulator 1300 is performed, the AR image 1050 may be generated by synthesizing (e.g., overlaying the virtual object image 1021 on the background image 1001) the virtual object image 1021 and the background image 1001. Any given implementation may or may not include an ISP simulator.

Figure 11A:
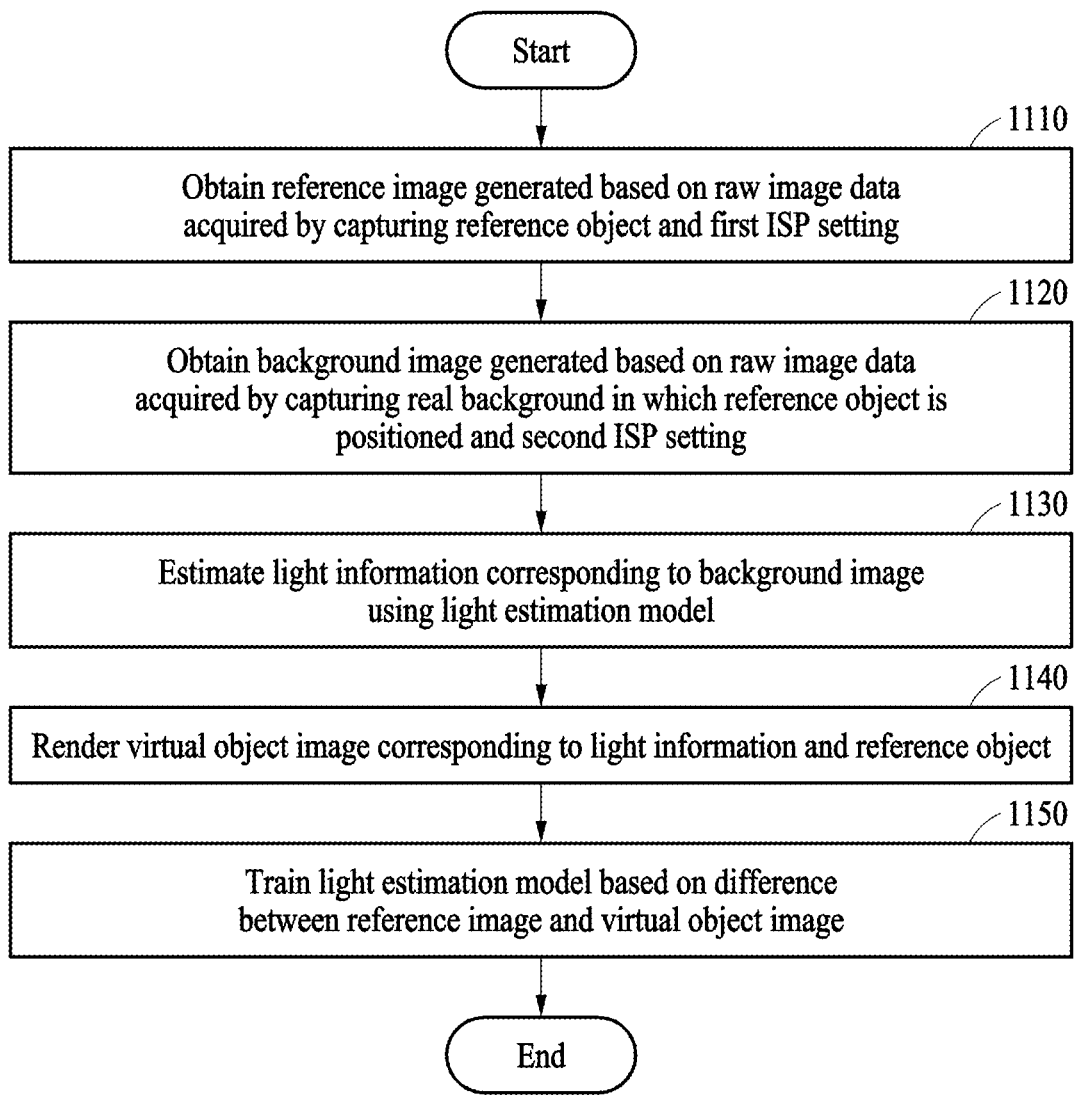
FIG. 11A illustrates an example of a method of estimating light, according to one or more embodiments.
Figure 11B:
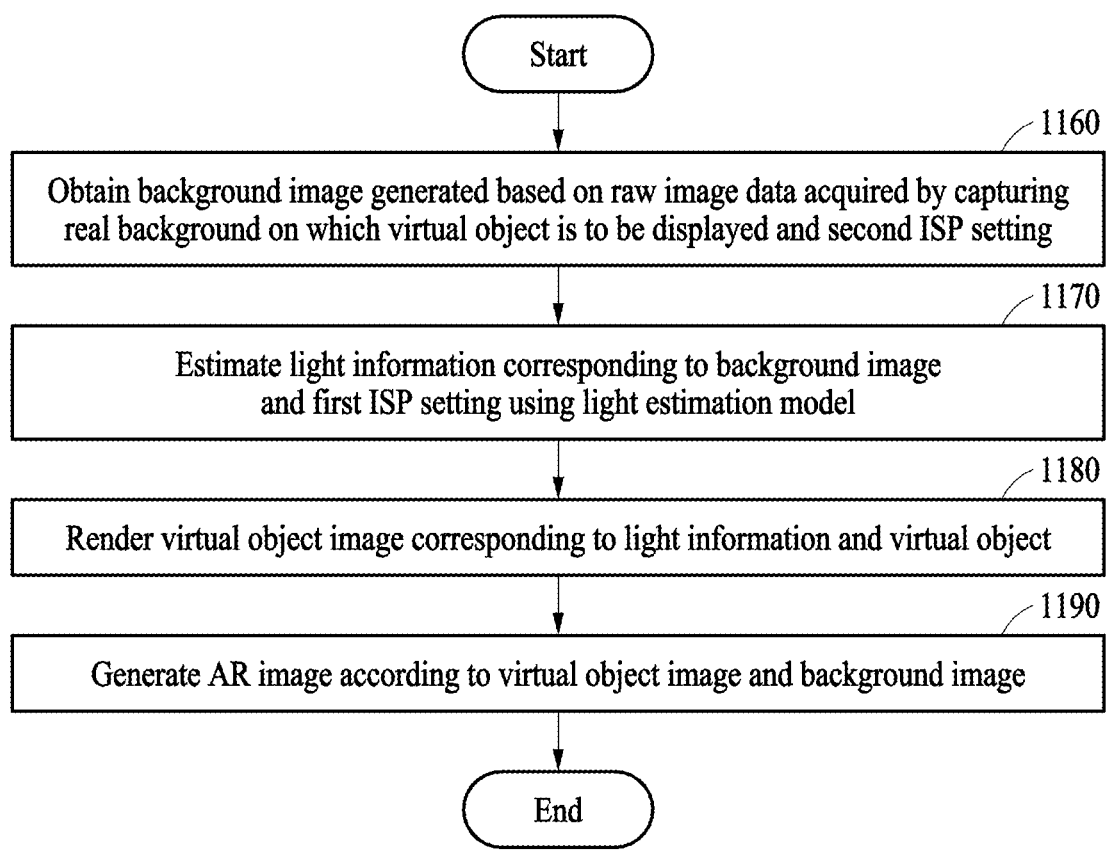
FIG. 11B illustrates an example of a method of estimating light, according to one or more embodiments.

FIGS. 11A and 11B illustrate examples of methods of estimating light, according to one or more embodiments. Referring to FIG. 11A, in operation 1110, a rendering device may obtain a reference image generated based on raw image data acquired by capturing a reference object and a first ISP setting corresponding thereto. In operation 1120, the rendering device may obtain a background image generated based on raw image data acquired by capturing a real background in which the reference object is positioned and a second ISP setting corresponding thereto. The first ISP setting may a fixed adjust value that controls an ISP element, and the second ISP setting may a variable adjust value that controls the ISP element. The ISP element may be one or more of auto a white balance element, an auto exposure element, a gamma correction element, a dynamic range compression element, and/or a wide dynamic range element.

The reference object may include sub-objects, each of which has a tone or a material different from the other, and planes supporting the sub-objects. The sub-objects may be represented by respective image portions having different dynamic ranges in raw image data acquired by capturing the reference object, and an image portion having a widest dynamic range (among the image portions of the respective sub-objects) may be selectively used in determining a difference between the reference image and the virtual object image.

The reference object may be connected to a camera that generates the reference image and the background image through a support. The camera may include a first camera that generates the reference image using the first ISP setting, and a second camera that generates the background image using the second ISP setting. Alternatively, the reference image and the background image may be generated through a camera that alternately uses the first ISP setting and the second ISP setting.

In operation 1130, the rendering device may estimate light information corresponding to the background image using a light estimation model. Input data corresponding to the background image and the second ISP setting may be input to the light estimation model. In operation 1140, the rendering device may render a virtual object image corresponding to the light information and the reference object. In operation 1150, the rendering device may train the light estimation model based on a difference between the reference image and the virtual object image. Operation 1140 may include rendering a shadow of the virtual object image, and operation 1150 may include training the light estimation model based on a difference between a shadow of the reference object in the reference image and a shadow rendered in the virtual object image.

Multiple reference images and background images may be used. A first reference image and a first background image may be obtained at a first position in a first direction, and a second reference image and a second background image may be obtained at a second position in a second direction. Operation 1130 may include estimating integrated light information corresponding to an integrated background image in which the first background image and the second background image are combined according to SLAM information based on the first position, the second position, the first direction, and the second direction. Operation 1140 may include rendering a first virtual object image corresponding to the first position and the first direction and a second virtual object image corresponding to the second position and the second direction, and operation 1150 may include training the light estimation model based on at least some of a difference between the first reference image and the first virtual object image and a difference between the second reference image and the second virtual object image.

Referring to FIG. 11B, in operation 1160, the rendering device may obtain the background image generated based on raw image data acquired by capturing the real background on which the virtual object is to be displayed and the second ISP setting. In operation 1170, the rendering device may estimate the light information corresponding to the background image and the first ISP setting using the light estimation model. The light estimation model may be in a state in which training is complete. That is, the example method of FIG. 11A may involve training a light estimation model, and the example method of FIG. 11B may involve using the trained model to render virtual object images using the trained light estimation model.

The light estimation model may be pre-trained through operations of obtaining a sample reference image generated based on raw image data acquired by capturing the reference object and the first ISP setting, obtaining a sample background image generated based on raw image data acquired by capturing a sample real background in which the reference object is positioned and the second ISP setting, estimating sample light information corresponding to the sample background image using the light estimation model, rendering a sample virtual object image corresponding to the sample light information and the reference object, and training the light estimation model based on a difference between the sample reference image and the sample virtual object image. These training operations may correspond to operations (operations 1110 to 1150) illustrated in FIG. 11A. To distinguish training data of FIG. 11A from inference data of FIG. 11B, the term "sample" may be used to identify the training data as such. For example, a reference image and a background image used for training may be respectively referred to as a sample reference image and a sample background image.

In operation 1180, the rendering device may render the virtual object image corresponding to the light information and the virtual object. In operation 1190, the rendering device may generate an AR image (e.g., a frame of a video sequence generated by repetition of the steps of FIG. 11B) according to the virtual object and the background image. When the AR image is being to be displayed on an opaque display, a simulated ISP element with the second ISP setting may be used to generate the AR image. When the AR image is to be displayed on a translucent display, a simulated ISP element may be omitted (or may a simulated ISP element with a corresponding setting may be used) for the AR image.

In addition, the description provided with reference to FIGS. 1 to 10, 12, and 13 may apply to the method of estimating light.

Figure 12:
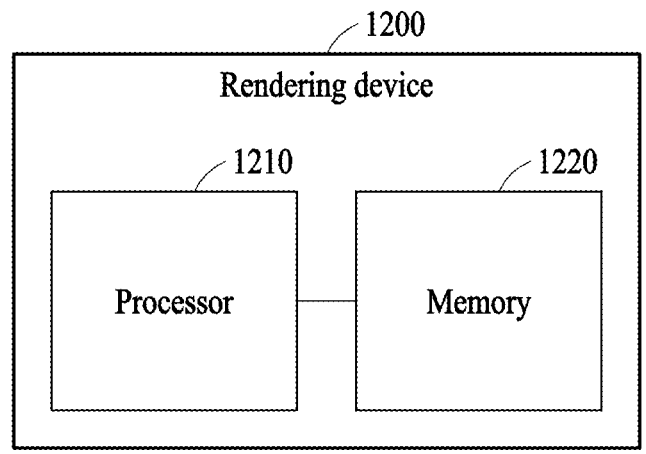
FIG. 12 illustrates an example of a configuration of an image processing device, according to one or more embodiments.

FIG. 12 illustrates an example of a configuration of a rendering device, according to one or more embodiments. Referring to FIG. 12, a rendering device 1200 may include a processor 1210 and a memory 1220. The memory 1220 is connected to the processor 1210 and stores instructions executable by the processor 1210, data to be operated by the processor 1210, or data processed by the processor 1219. The instructions may be readily configured based on the description herein (e.g., by compiling source code corresponding to methods described herein). The memory 1220 may include non-transitory computer-readable media, for example, high-speed random access memory and/or non-volatile computer-readable storage media, such as, for example, at least one disk storage device, flash memory device, or other non-volatile solid state memory device.

The processor 1210 may execute the instructions to perform the operations of FIGS. 1 to 11 and 13. The processor 1210 may obtain a reference image generated based on raw image data acquired by capturing a reference object and a first ISP setting, obtain a background image generated based on raw image data acquired by capturing a real background in which the reference object is positioned and a second ISP setting, estimate light information corresponding to the background image using a light estimation model, render a virtual object image corresponding to the light information and the reference object, and train the light estimation model based on a difference between the reference image and the virtual object image. The processor 1210 may obtain a background image generated based on raw image data acquired by capturing the real background on which a virtual object is to be displayed and the second ISP setting, estimate light information corresponding to the background image and the first ISP setting using the light estimation model, render a virtual object image corresponding to the light information and the virtual object, and generate an AR image according to the virtual object image and the background image. In addition, the description provided with reference to FIGS. 1 to 11 and 13 may apply to the rendering device 1200.

Figure 13:
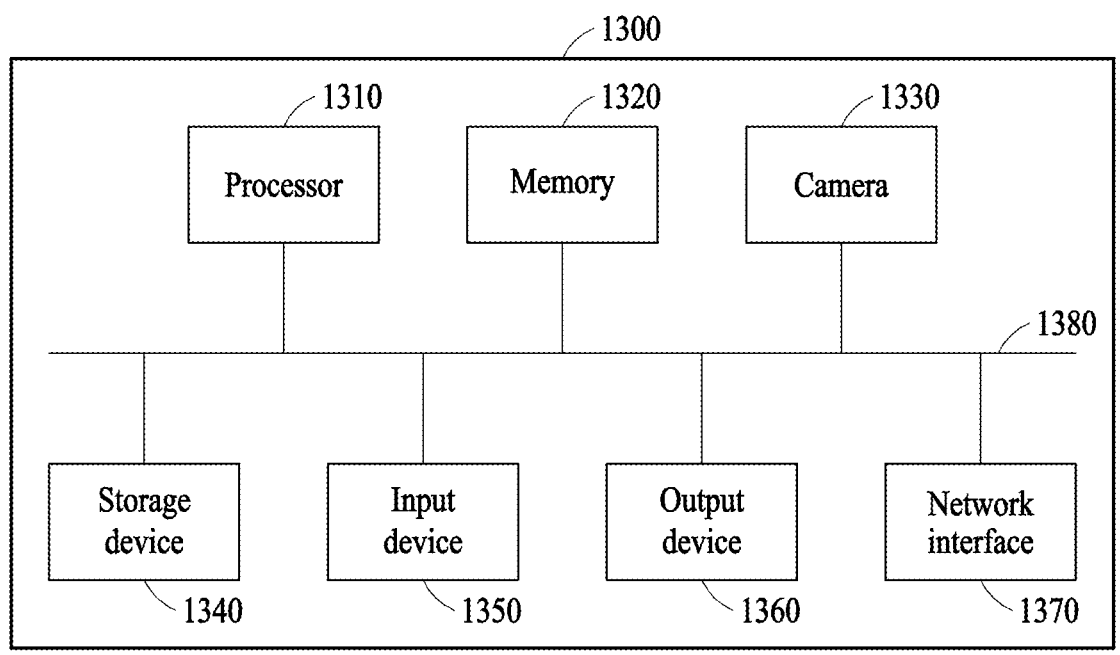
FIG. 13 illustrates an example of a configuration of an electronic device, according to one or more embodiments.

FIG. 13 illustrates an example of a configuration of an electronic device, according to one or more embodiments. The electronic device may be, or may include, the rendering device 1200. Referring to FIG. 13, an electronic device 1300 may include a processor 1310, a memory 1320, a camera 1330, a storage device 1340, an input device 1350, an output device 1360, and a network interface 1370 that may communicate with each other through a communication bus 1380. For example, the electronic device 1300 may be implemented as, or a portion of, for example, a mobile device such as a mobile phone, a smart phone, a personal digital assistant (PDA), a netbook, a tablet computer, a laptop computer, and the like, a wearable device such as a smart watch, a smart band, smart glasses, and the like, a home appliance such as a television (TV), a smart TV, a refrigerator, and the like, a security device such as a door lock, a vehicle such as an autonomous vehicle, a smart vehicle, and an AR device such as AR glasses. Again, the electronic device 1300 may be, or may include, structurally and/or functionally, the rendering device 1200 of FIG. 12.

The processor 1310 may execute functions and instructions for execution in the electronic device 1300. For example, the processor 1310 may process instructions stored in the memory 1320 or the storage device 1340. The processor 1310 may perform the operations described through FIGS. 1 to 12. The memory 1320 may include computer-readable storage media or a computer-readable storage device. The memory 1320 may store instructions to be executed by the processor 1310 and may store related information while software and/or an application is being executed by the electronic device 1300. The processor 1310 may be a variety of types of processor(s), for example graphics processing unit(s), central processing Links), or the like.

The camera 1330 may capture a photo and/or a video. The camera 1330 may generate a reference image based on raw image data acquired by capturing a reference object and a fixed ISP setting, and generate a background image based on raw image data acquired by capturing a real background in which the reference object is positioned and a variable ISP setting. The storage device 1340 may include a computer-readable storage medium or computer-readable storage device. The storage device 1340 may store a larger quantity of information than the memory 1320 for a long time. For example, the storage device 1340 may include a magnetic hard disk, an optical disc, a flash memory, a floppy disk, or other types of non-volatile memory known in the art.

The input device 1350 may receive an input from the user through traditional input manners, such as a keyboard and a mouse, and through newer input manners such as touch, voice, and an image. For example, the input device 1350 may include a keyboard, a mouse, a touch screen, a microphone, or any other device that detects the input from the user and transmits the detected input to the electronic device 1300. The output device 1360 may provide an output of the electronic device 1300 to the user through a visual, auditory, or haptic channel. The output device 1360 may include, for example, a display, a touch screen, a speaker, a vibration generator, or any other device that provides the output to the user. The network interface 1370 may communicate with an external device through a wired or wireless network.

The computing apparatuses, the vehicles, the electronic devices, the processors, the memories, the image sensors, the vehicle/operation function hardware, the displays, the information output system and hardware, the storage devices, and other apparatuses, devices, units, modules, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtracters, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SSD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation, Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure. Therefore, the scope of the disclosure is defined not by the detailed description, but by the claims and their equivalents, and all variations within the scope of the claims and their equivalents are to be construed as being included in the disclosure.

What is claimed is:

1. A method performed by an electronic device, the method comprising:
generating a reference image based on image data acquired by capturing a reference object and based on a first image signal processing (ISP) setting;
generating a background image based on raw image data acquired by capturing a real background in which the reference object is positioned and based on a second ISP setting;
estimating light information corresponding to the background image using a light estimation model;
rendering a virtual object image corresponding to the light information and the reference object; and
training the light estimation model based on a difference between the reference image and the virtual object image.

2. The method of claim 1, wherein
the first ISP setting is configured to control an ISP element according to a fixed value, and
the second ISP setting is configured to control the ISP element according to a variable value.

3. The method of claim 2, wherein the ISP element comprises one or more of auto white balance element, an auto exposure element, a gamma correction element, a dynamic range compression element, or a wide dynamic range element.

4. The method of claim 1, wherein the reference object comprises:
sub-objects, each of which has a tone or material different from each of the other sub-objects.

5. The method of claim 4, wherein the sub-objects comprise respective planes that support the sub-objects.

6. The method of claim 4, wherein
the sub-objects are respectively represented by image data portions having different dynamic ranges in the raw image data, and
a portion of image data having a widest dynamic range among the image data portions is selected for determining the difference between the reference image and the virtual object.

7. The method of claim 5, wherein the reference object is structurally connected, through a support, to a camera that generates the reference image and the background image.

8. The method of claim 7, wherein the camera comprises:
a first camera that generates the reference image according to the first ISP setting; and
a second camera that generates the background image according to the second ISP setting.

9. The method of claim 5, wherein
the rendering of the virtual object comprises rendering a shadow of the virtual object image, and
the training of the light estimation model comprises training the light estimation model based on a difference between image data of a shadow of the reference object in the reference image and the rendered shadow of the virtual object image.

10. The method of claim 1, wherein the reference image is generated by a camera using the first ISP setting, and wherein the background image is generated by the camera using the second ISP setting.

11. The method of claim 1, wherein input data corresponding to the background image and the second ISP setting is used as an input for the light estimation model.

12. The method of claim 1, wherein
the reference image comprises a first reference image captured at a first position in a first direction and a second reference image captured at a second position in a second direction,
the background image comprises a first background image captured at the first position and in the first direction, and a second background image captured at the second position and in the second direction,
the estimating of the light information comprises estimating integrated light information corresponding to an integrated background image in which the first background image and the second background image are combined according to simultaneous localization and mapping (SLAM) information based on the first position, the second position, the first direction, and the second direction,
the rendering of the virtual object comprises rendering, based on the integrated light information, a first virtual object image corresponding to the first position and the first direction and a second virtual object image corresponding to the second position and the second direction, and
the training of the light estimation model comprises training the light estimation model based on a difference between the first reference image and the first virtual object image and a difference between the second reference image and the second virtual object image.

13. A method of estimating light comprising:
estimating light information corresponding to a background image and a first ISP setting using a light estimation model, wherein the background image is generated based on raw image data acquired by capturing a real background relative to which a virtual object is to be displayed and based on a second ISP setting;
rendering a virtual object image of the virtual object based on the light information; and
generating an augmented reality (AR) image according to the virtual object image and the background image.

14. The method of claim 13, wherein the generating the AR image comprises synthesizing the virtual object image and the background image, wherein the AR image comprises image data based on both the virtual object image and image data based on the background image.

15. The method of claim 13, wherein
a simulated ISP element generates the virtual object image based on the second ISP setting, and
the virtual object image is used to generate the AR image without controlling the ISP element based on the second ISP setting, in response to the AR image being displayed on a translucent display.

16. The method of claim 15, wherein the simulated ISP element is used based on an opaque display being used to display the AR image.

17. The method of claim 13, wherein the light estimation model is pre-trained through:
generating a sample reference image generated based on raw image data acquired by capturing a reference object and based on a first ISP setting;
generating a sample background image generated based on raw image data acquired by capturing a sample real background in which the reference object is positioned and based on the second ISP setting;
estimating sample light information corresponding to the sample background image using the light estimation model;
rendering a sample virtual object image corresponding to the sample light information and the reference object; and
training the light estimation model based on a difference between the sample reference image and the sample virtual object image.

18. A non-transitory computer-readable storage medium storing instructions that, when executed by a processor, cause the processor to perform the method of claim 13.

19. An electronic device, comprising:
a camera configured to generate a reference image based on raw image data acquired by capturing a reference object and based on a first image signal processing (ISP) setting, and generate a background image based on raw image data acquired by capturing a real background in which the reference object is positioned and based on a second ISP setting; and
a processor configured to estimate light information corresponding to the background image using a light estimation model, render a virtual object image corresponding to the light information and the reference object, and train the light estimation model based on a difference between the reference image and the virtual object image.

20. The electronic device of claim 19, wherein
the first ISP setting is configured to control an ISP element according to a fixed value, and
the second ISP setting is configured to control the ISP element according to a variable value.

21. The electronic device of claim 19, wherein
the reference object comprises sub-objects, each of which has a tone or comprises a material different from each of the others, and wherein the sub-objects comprise respective planes,
the sub-objects are respectively represented by image data portions having different dynamic ranges in the raw image data, and
a portion of image data having a widest dynamic range among the objects is selected, based thereon, to be used in determining the difference between the reference image and the virtual object.

22. The electronic device of claim 19, wherein input data corresponding to the background image and the second ISP setting is used as an input for the light estimation model.

23. The electronic device of claim 19, wherein
the reference image comprises a first reference image captured at a first position in a first direction and a second reference image captured at a second position in a second direction,
the background image comprises a first background image captured at the first position and in the first direction, and a second background image captured at the second position and in the second direction, and wherein
the processor is configured to:
estimate integrated light information corresponding to an integrated background image in which the first background image and the second background image are combined according to simultaneous localization and mapping (SLAM) information based on the first position, the second position, the first direction, and the second direction;
render, based on the integrated light information, a first virtual object image corresponding to the first position and the first direction and a second virtual object image corresponding to the second position and the second direction; and
train the light estimation model based on a difference between the first reference image and the first virtual object image and a difference between the second reference image and the second virtual object image.

* * * * *